US008615795B2

(12) United States Patent
Cottrell et al.

(10) Patent No.: US 8,615,795 B2
(45) Date of Patent: Dec. 24, 2013

(54) SECURE NETWORK PRIVACY SYSTEM

(75) Inventors: Lance M. Cottrell, San Diego, CA (US);
James A. Reynolds, Carlsbad, CA (US);
Darya Mazandarany, San Diego, CA (US); Steve Walsh, Tara (AU); Peleus G. Uhley, Alameda, CA (US); Gene Nelson, Spring Valley, CA (US)

(73) Assignee: NTREPID Corporation, Herndon, VA (US)

( * ) Notice: Subject to any disclaimer, the term of this patent is extended or adjusted under 35 U.S.C. 154(b) by 1356 days.

(21) Appl. No.: 10/560,725

(22) PCT Filed: Jun. 25, 2004

(86) PCT No.: PCT/US2004/020562
§ 371 (c)(1),
(2), (4) Date: Aug. 21, 2008

(87) PCT Pub. No.: WO2005/001660
PCT Pub. Date: Jan. 6, 2005

(65) Prior Publication Data
US 2009/0013399 A1    Jan. 8, 2009

Related U.S. Application Data

(60) Provisional application No. 60/483,277, filed on Jun. 25, 2003, provisional application No. 60/482,786, filed on Jun. 25, 2003, provisional application No. 60/482,628, filed on Jun. 25, 2003, provisional application No. 60/482,784, filed on Jun. 25, 2003, provisional application No. 60/482,785, filed on Jun. 25, 2003.

(51) Int. Cl.
*H04L 29/06* (2006.01)

(52) U.S. Cl.
USPC .......................................................... 726/12

(58) Field of Classification Search
USPC .......................................................... 726/12
See application file for complete search history.

(56) References Cited

U.S. PATENT DOCUMENTS

| 5,586,260 | A | 12/1996 | Hu | |
| 6,938,171 | B1* | 8/2005 | Isomichi et al. | 726/12 |
| 2001/0029496 | A1 | 10/2001 | Otto et al. | |
| 2002/0062384 | A1 | 5/2002 | Tso | |
| 2002/0198777 | A1 | 12/2002 | Yuasa | |
| 2003/0023717 | A1 | 1/2003 | Lister | |
| 2004/0015725 | A1* | 1/2004 | Boneh et al. | 713/201 |

* cited by examiner

*Primary Examiner* — Jason Gee
(74) *Attorney, Agent, or Firm* — Squire Sanders (US) LLP

(57) ABSTRACT

The invention provides a method and system of receiving communications from a network device in a network to a source of network data and establishing a secure and/or authenticated network connection between the network device and the source that appears to the network device as a direct connection to the source of network data. Broadly conceptualized, the method and system may also include a parsing module that modifies the network data passing back and forth between the network device and the source of network data.

17 Claims, 8 Drawing Sheets

SECURE NETWORK PRIVACY SYSTEM

REFERENCE TO EARLIER-FILED APPLICATIONS

This application claims the benefit of the following U.S. Provisional Applications, all filed Jun. 25, 2003: (a) Ser. No. 60/483,277 titled "A Multiple Platform Network Privacy System"; (b) Ser. No. 60/482,786 titled "A Multiple Platform Network Privacy System;" (c) Ser. No. 60/482,628 titled "A Secure Network Privacy System;" (d) Ser. No. 60/482,784 titled "A Network Privacy System;" and (e) Ser. No. 60/482,785 titled "GUI for a Network Privacy System," which Applications are hereby incorporated herein in their entirety by this reference.

BACKGROUND OF THE INVENTION

1. Field of the Invention

This invention relates generally to network communication systems. In particular, this invention relates to a secure network privacy system.

2. Related Art

As global computer networks, such as the Internet, continue to grow globally at a rapid pace, an increasing number of people and businesses from around the world are accessing these networks for both business and personal activities. As a result, networks such as the Internet have become a virtual community where people communicate with each other by sending and receiving electronic, voice and image messages for both business and pleasure. These communications may include sharing ideas and information, sending personal and business messages back and forth, researching information, expressing opinions and ideas both personal and political, and conducting business negotiations and transactions (generally known as "electronic commerce" or "e-commerce"). In response to this new electronic activity, businesses and certain individuals attempt to identify and track individual Internet users for numerous purposes, including but not limited to, advertising, market research, customizing information for Internet sites (i.e., "websites"), snooping and eavesdropping on communications, as well as fraud and other malicious activities. Many of these attempts are threats to the individual privacy of users of these networks because they attempt to gain personal information about the user and the user's activities online (generally referred to as "online activities"), often without the user's consent or knowledge.

These threats acquire information about the user by logging or tracking a user's Internet Protocol ("IP") address (the electronic address that specifically identifies a user's computer to the network) or by installing programs or files on the user's computer such as "cookies," ActiveX™ applications, Java™, script files, Spyware, or hostile programs such as viruses. These threats allow an outside user, be it a business or an individual entity, to perform such tasks as identifying the user, obtaining the user's personal information that is stored on his/her computer (including names, addresses, private financial files, and/or other confidential, private and/or sensitive information), as well as tracking the user's activities on the Internet, including recording every website visited or every e-mail sent or received by the user. Malicious programs such as viruses may also be installed on the user's computer that can modify, erase or destroy the user's operating system or personal files.

Unfortunately, many people that utilize the Internet do not understand how networks such as the Internet function nor do they generally appreciate the number and types of threats that they may experience once they connect (i.e., "log-on") to the Internet. Past approaches at protecting users connected to the Internet include using "firewalls" to block certain types of threats, virus protection programs for detecting malicious programs, and spyware and cookie-file-removal software. These approaches, however, do not protect a user's identity nor do they protect against malicious users intercepting data between the client and server because they may attempt to disinfect a user from intruders after the fact. Approaches in the past at protecting the user's identity have included allowing a user to connect to an intermediate server (sometimes referred to as a "proxy server") connected to the Internet that extracted off the user's IP information and substituted for it the IP address of the intermediate server, thus creating an anonymous user that could then continue to surf the Net without worrying that his IP information would be used to identify him.

These past approaches do not protect a user's identity as soon as the user connects to the Internet because connected websites are able to read and identify the user's IP address among other things. A need therefore exists to protect the identity of the user upon connecting to the Internet (i.e., known as "surfing the web" or "surfing the Net"). Thus there is a need for a privacy management approach that solves the problems recited above and allows Internet users to easily maintain their privacy.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

The secure network privacy service approach that is described in this detailed description along with the figures is an example implementation of many possible implementations. The components are generally a network-level (TCP/IP) traffic interceptor (client side), a client proxy, a server proxy, a SSL module, and multiple selected web-based services (such as user authentication, server lists, recommended site settings lists, etc.). Because this implementation is readily applicable to the Internet, the Internet is used for illustrative purposes only and different implementations may apply to other networks. References herein to specific protocols, such as SSL and TSL, should not be deemed to limit this invention since it is capable of implementation using any network protocol and any encryption method or protocol.

Reference is often made to cache or registry entries or other specific ways of storing information. This information could be stored in any number of ways, including in flat files, indexed files, and local or remote databases, among others. Reference is also made to cookies. Many other information-transfer techniques may be used in place of cookies, including HTML headers, changes to URLs or other addresses, and any other standard or custom message or data structure. Reference is also made to XML data structures. In general, these structures can be replaced with other types of data structures, including other standard and non-standard, encrypted and non-encrypted structures. Reference is also made to the term "module," which may refer to an element or unit of either software or hardware that may perform one or more functions or procedures. With respect to software, a module may be part of a program, which may be composed of one or more modules that are independently developed and linked together when the program is executed. With respect to hardware, the module may be any self-contained component of the hardware. Finally, the abbreviation CA stands for "Certificate Authority" and refers to a third-party entity that issues digital certificates that are used to create digital signatures or public-private keys used for authentication and encryption such as those used by the Secure Sockets Layer (SSL) protocol. Originally developed by Netscape, SSL is a widely accepted protocol in use on the World Wide Web for authenticated and encrypted communication between clients and servers and its latest specification is SSL 3.0. This is being replaced by TLS protocol version 1.0 under ITEF RFC 2246 (and additional RFC documents based on it). TLS is an extension of SSL that can be used for securing many protocols other than http, for example, smtp, pop3, and others. These digital certificates, digital signatures, public and private keys and other like authentication and encryption enablers are sometimes collectively and singularly referred to as "identifiers."

Figure 1:
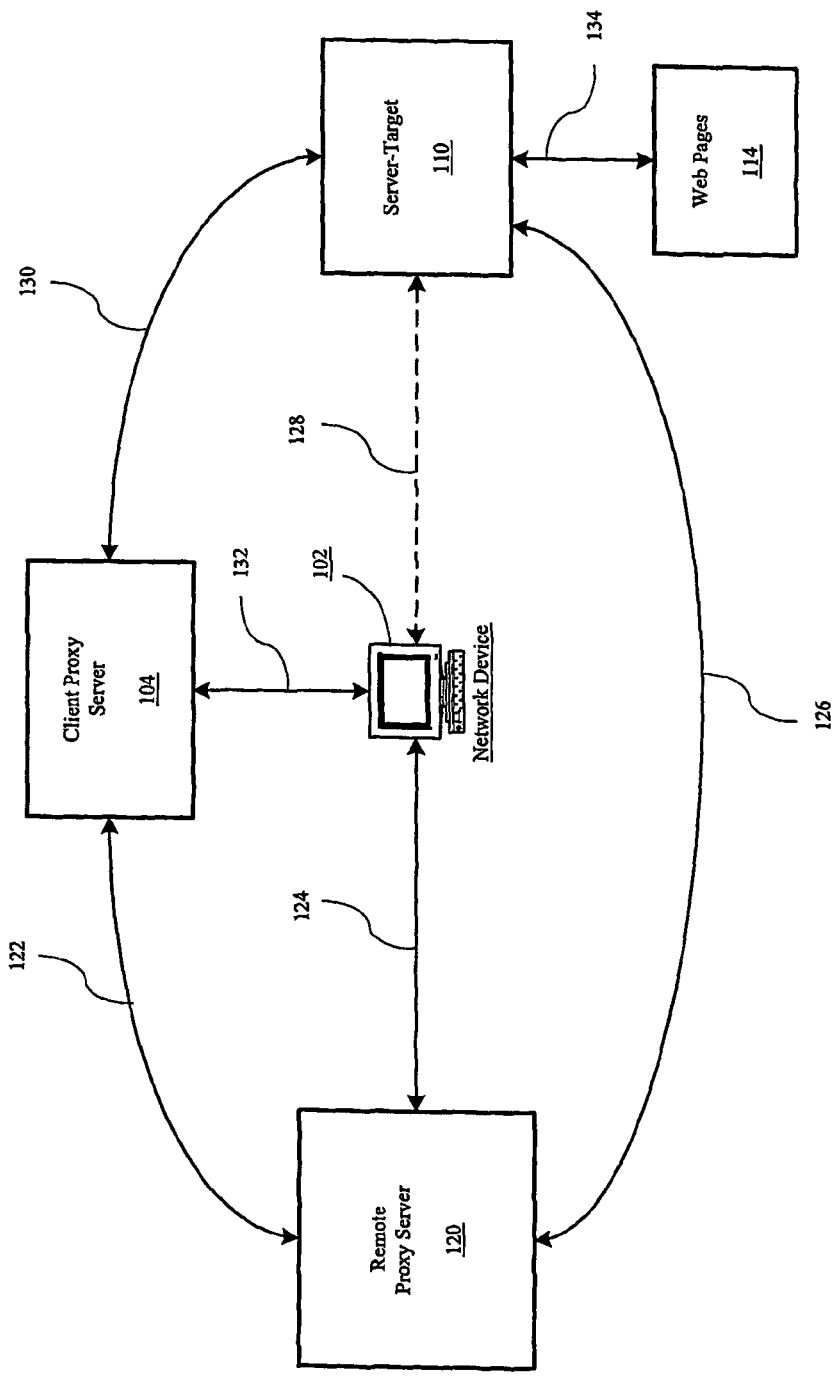
FIG. 1 is a block diagram of the network elements of a secure network privacy system.

Generically speaking, the combination of these components is an implementation of a "secure network privacy system." FIG. 1 is a block diagram of these basic components showing their interconnection. The client portion is the Client Proxy Server 104, while the server portion is the Remote Proxy Server 120. In this implementation, a user uses a Network Device 102 to establish a connection to the Server-Target 110; for example, a user using a PC connects to the Internet in order to retrieve data, such as Web pages 114. The Network Device 102 may be a PC, a PDA, a workstation, a gaming desktop, an Internet-enabled cell phone or like electronic device. This communication from the Network Device 102 is "intercepted" by either the Client Proxy Server 104 via communication path 132 or the Remote Proxy Server 120 via communication path 124. In general, the Remote Proxy Server 120 may be a remote server while the Client Proxy Server 104 may reside on the Network Device 102, or another server along the communication paths to Remote Proxy Server 120 or Server-Target 110 (for example, a router, gateway, firewall, or proxy at the edge of the user's internal network). The Remote Proxy Server 120 may also be implemented in hardware such as networked game systems (e.g., Xbox, Playstation or GameCube), or a router, network-address translation device, switch, firewall or other network device or appliance. The Client Proxy Server 104 or the Remote Proxy Server 120 then establishes a connection with the Server-Target 110 via communication paths 130 and 126, respectively.

The Client Proxy Server 104 and the Remote Proxy Server 120 relay data from the client on the Network Device 102 to the Server-Target 110 hosting the content or service the Network Device 102 may be attempting to connect to and/or access. The Remote Proxy Server 120 masks the IP address associated with the Network Device 102 and may perform other actions based on the content of the request or the contents of the reply from the Server-Target 110. These actions may include adding, changing, or removing text, data, information, scripts or other content either from the Network Device 102 connection to the Server-Target 110, or from the Server-Target 110 connection back to the Network Device 102. The Remote Proxy Server 120 may not be required in all implementations of the secure network. In some implementations, the secure network may connect directly to the Server-Target 110 through the Client Proxy Server 104. Whether or not the Remote Proxy Server 120 is used may depend on the privacy settings the Network Device 102 has set for that particular site. It may be desirable to provide different levels or kinds of privacy protection based on the particular Server-Target 110 to which the Network Device 102 is connecting. The Remote Proxy Server 120 may only be used if the masking of the user's IP, and/or other changes the Remote Proxy Server 120 may make to the data are required for the particular settings of the Network Device 102. Otherwise the connection may be direct. Because this interception and connection is transparent to the Network Device 102 and its user, the user considers itself to be in communication with the Server-Target 110 via communication path 128. In other embodiments, the Remote Proxy Server 120 may be used for all connections.

Figure 2:
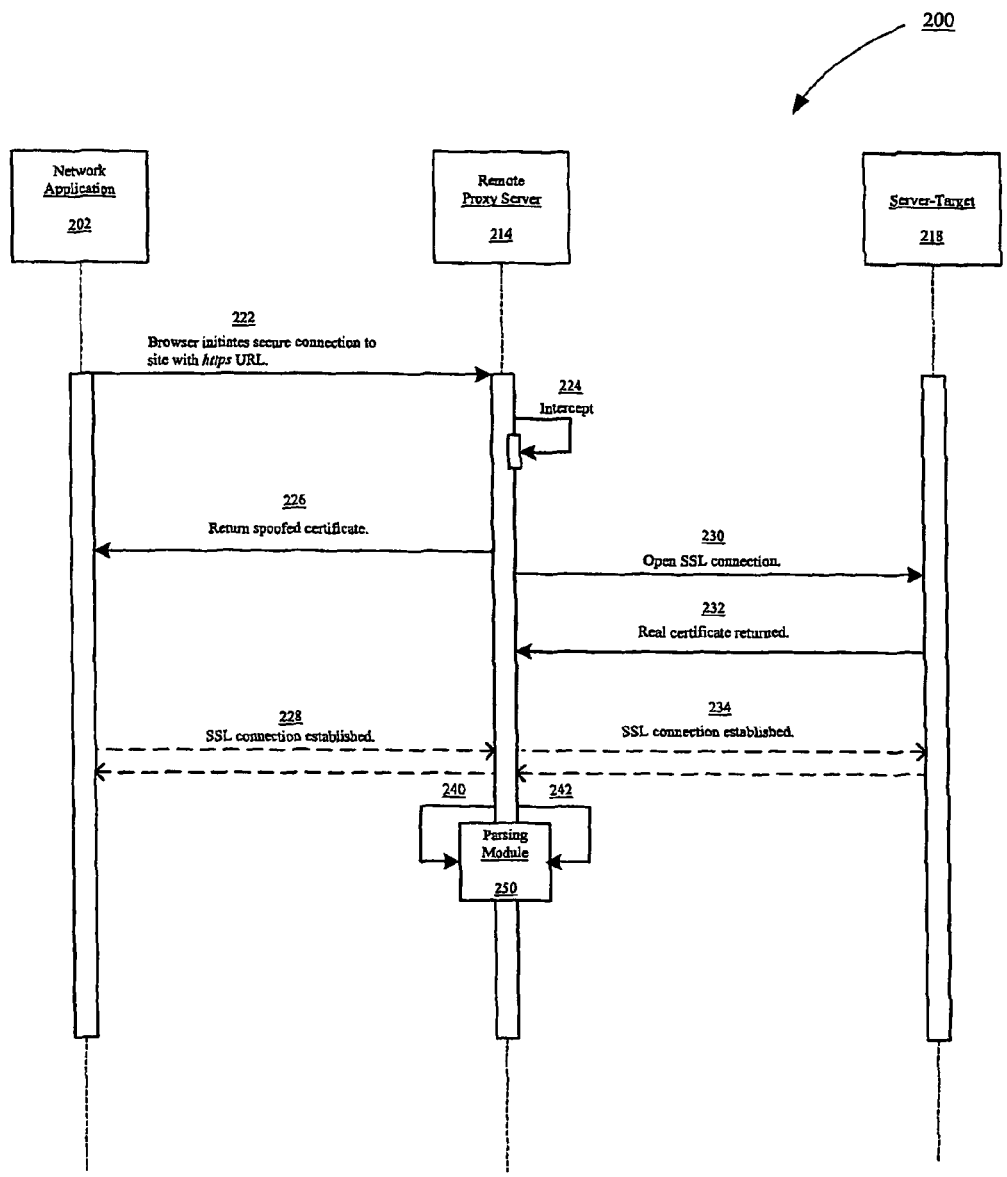
FIG. 2 is a signal flow diagram (which may also be referred to as a "sequence diagram") of an example process of establishing a secure connection.

Turning to FIG. 2, a signal flow diagram (which may also be referred to as a "sequence diagram") for an example process performed by the architecture of the implementation shows the Remote Proxy Server 214 capable of intercepting an outgoing connection from the Network Application 202 (which may be any application or device seeking access to a network, with a typical example being a browser on a PC) and establishing another secure connection that protects the privacy and integrity of the Network Device 102, FIG. 1. This example process starts in 222 with a request by the Network Application 202 to connect to a secure site. The Remote Proxy Server 214 transparently intercepts the outgoing connection 224 from the Network Application 202, determines what website the Network Application 202 is attempting to connect to, and returns a "spoofed" certificate 226 for the Server-Target 218, that is, a certificate from Remote Proxy Server 214 that appears to the Network Application 202 as a certificate directly from the Server-Target 218. This certificate is then used to establish the SSL connection 228 between the Network Application 202 and the Remote Proxy Server 214.

At the same time, the Remote Proxy Server 214 opens a SSL connection 230 with the Server-Target 218 and subsequently receives the real certificate 232 from the Server-Target 218. If client authentication to the server is necessary, i.e., the server requests client authentication, the Remote Proxy Server 214 may also send a certificate and perform other functions required to complete the SSL handshake and authenticate the Network Application 202 to the Server-Target 218. The SSL connection is then established 234 between the Remote Proxy Server 214 and the Server-Target 218. Once a two-way SSL connection is established, the Parsing Module 250 (which is an element of the Remote Proxy Server 214) may be able to parse, edit, verify, monitor and otherwise alter the content of the packets passing back 240 and forth 242 through the Remote Proxy Server 214. For example, the Parsing Module 250 could: remove referrer or other identifying headers from the http request, remove cookies from the request or response headers, modify cookies in the response headers to change their content or scope or expiration, remove references to files residing on other files from the returned http document, remove identifying information from web form submissions, remove identifying information from automated connections established by "spyware" or other local software running on Network Device 102, translate the language of the content of outgoing or incoming data streams, replace sensitive information like e-mail addresses or credit card numbers with either false information or alternative information that may be specific to the Server-Target 218.

Figure 3:
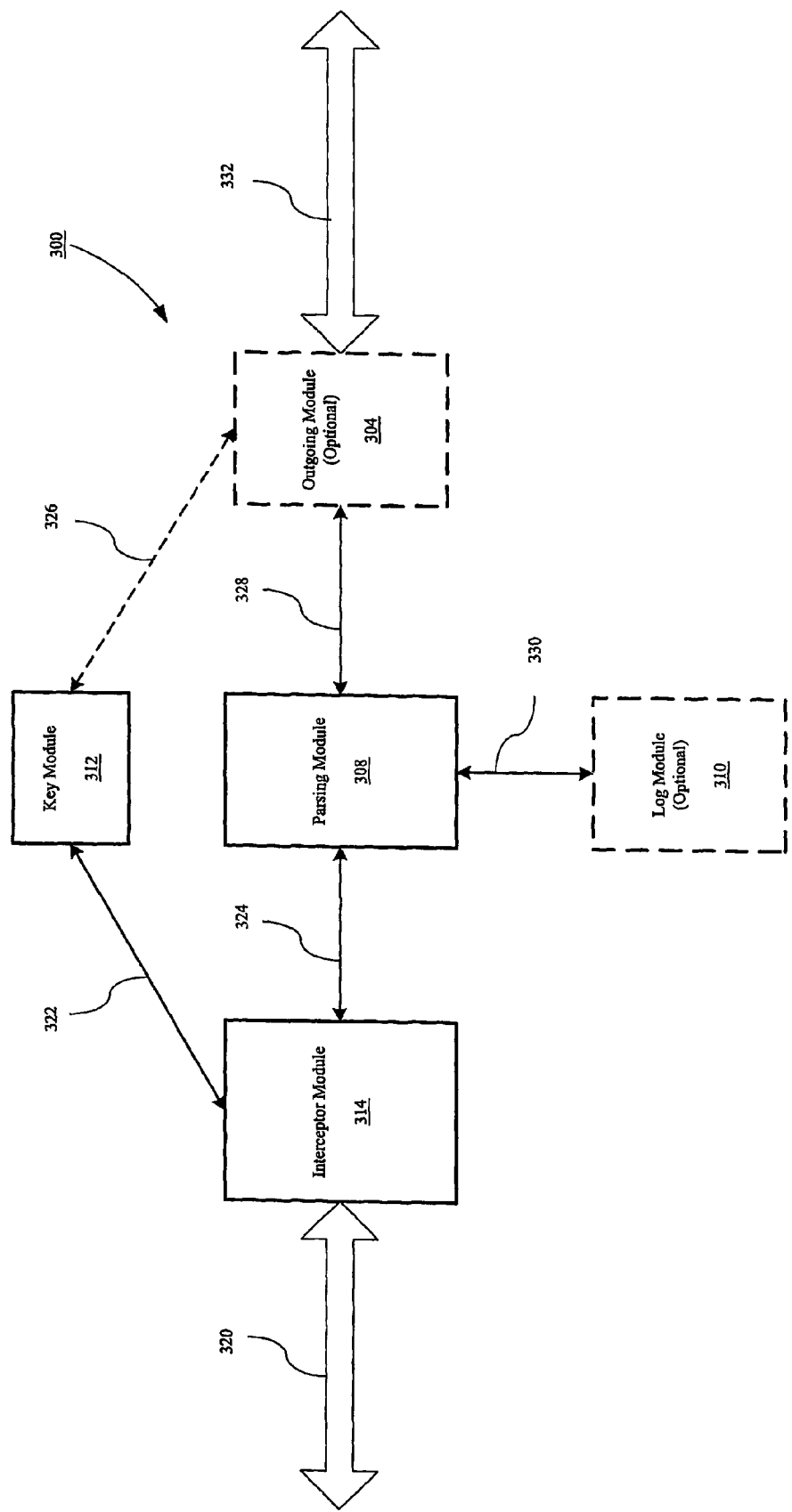
FIG. 3 is a block diagram of the Client Proxy Server of FIG. 1.

In FIG. 3, a block diagram of the Client Proxy Server 104, FIG. 1, is shown. This portion of the implementation intercepts the outgoing connection from the user's PC or other network device to the computer hosting the content or service the network device is trying to access (the Server-Target 110). The initial communication from the Network Device 102 (not shown) may be directed to the Interceptor Module 314 via secure communication path 320. The Parsing Module 308 may perform certain actions on the data passing back and forth to the Network Device 102 based on the content of the request from the Network Device 102 or the contents of the reply from the Server-Target 110. These actions may include adding, changing, or removing text, data, information, scripts or other content either from the connection from the Network Device 102 to the Server-Target 110, or from the connection from the Server-Target 110 back to the Network Device 102.

The Key Module 312 provides SSL functionality for the Network Device 102 and is utilized when a secure connection to the Server-Target 110 is desired. In other implementations, other secure connection protocols may be used. SSL-enabled client software requires server and client authentication using public-private keys and CA certificates. The Key Module 312 generates site SSL certificates by first attempting to retrieve pre-generated site SSL certificates stored in a table in cache on the disk, or if not found, by generating a new certificate dynamically using a universal site certificate and the User's CA Secret Key.

The Log Module 310 may be in communication with Parsing Module 308 via communication path 330 and accumulates and stores privacy statistics for use in automated site threat analysis and rating, activity logging, performance monitoring, billing, or other uses. By way of illustration, these statistics may include per site privacy statistics and statistics counting the number and type of viruses, pop-ups, cookies, and other malicious or unwanted intrusions into the network system.

The Outgoing Module 304 (which is optional) may be in communication with Parsing Module 308 and Key Module 312 via communication paths 328 and 326, respectively, and provides outgoing SSL connectivity between the Client Proxy Server 104, FIG. 1, and either the Remote Proxy Server 120, FIG. 1, or the Server-Target 110, FIG. 1. The Outgoing Module 304 may also provide any client-side authentication that may be required by the Server-Target 110, FIG. 1.

Figure 4:
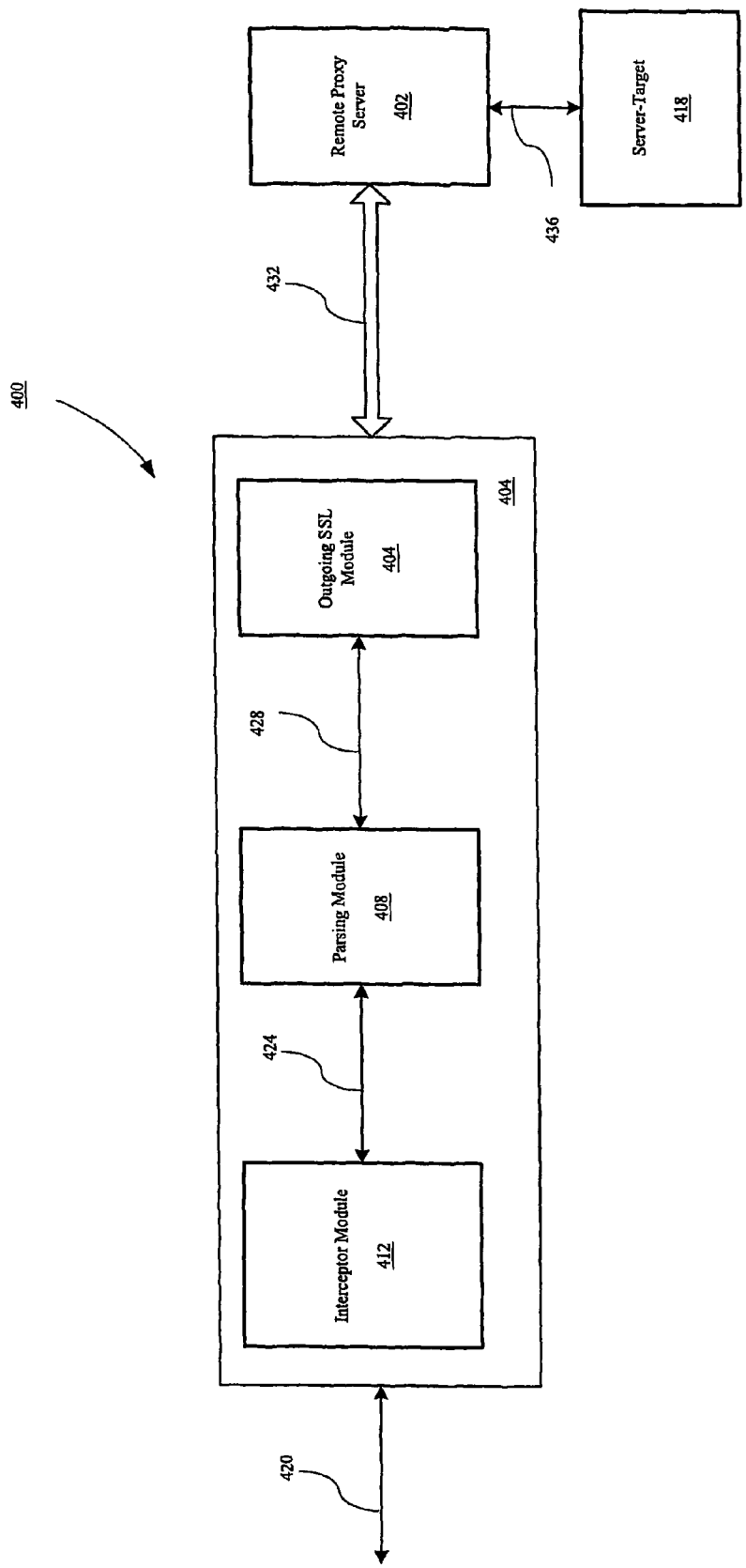
FIG. 4 is a block diagram of the Full-Time SSL implementation.

Turning to FIG. 4, a block diagram of the Full-Time SSL implementation is shown. This Full-Time SSL implementation may reside on the Client Proxy Server 104, FIG. 1, which may itself reside on the Network Device 102, FIG. 1. In this example, the Full-Time SSL implementation resides on the Client Proxy Server 404. In general, the Full-Time SSL implementation creates a secure connection along communication path 432 between the Client Proxy Server 404 and the Remote Proxy Server 402 using the Interceptor Module 412, the Parsing Module 408 and the Outgoing SSL Module 404, whether or not the connection between the Remote Proxy Server 402 and the Server-Target 418 is secure. For example, the connection via communication path 432 could be wireless, such as Wi-Fi, broadband or other Internet connection that would otherwise be insecure. The initial communication from the Network Device 102 is directed to the Interceptor Module 412 via communication path 420. The Parsing Module 408 performs certain actions on the data passing back and forth to the Network Device 102 based on the content of the request from the Network Device 102 or the contents of the reply from the Server-Target 418. These actions may include adding, changing, or removing text, data, information, scripts or other content from either the data from the Network Device 102 to the Server-Target 418, or from the Server-Target 418 back to the Network Device 102.

The Outgoing SSL Module 404 provides SSL functionality to the Network Device 102 and may be utilized whether or not a secure connection to the Server-Target 418 is desired. Full-Time SSL enables users to connect securely to the Remote Proxy Server 402 using a secure-connection protocol regardless of whether the connection to the Server-Target 418 is secure. The connection to the Server-Target 418 may or may not use a secure-connection protocol and therefore the connection between the Remote Proxy Server 402 and the Server-Target 418 may not be secure. SSL-enabled client software may require server and client authentication using public-private keys and CA certificates. The Outgoing SSL Module 404 generates site SSL certificates by first selecting pre-generated site SSL certificates stored in a table in cache on the disk, or if not found, by generating a new certificate by normally using a universal site certificate and the CA Secret Key of the Network Device 102.

Figure 5:
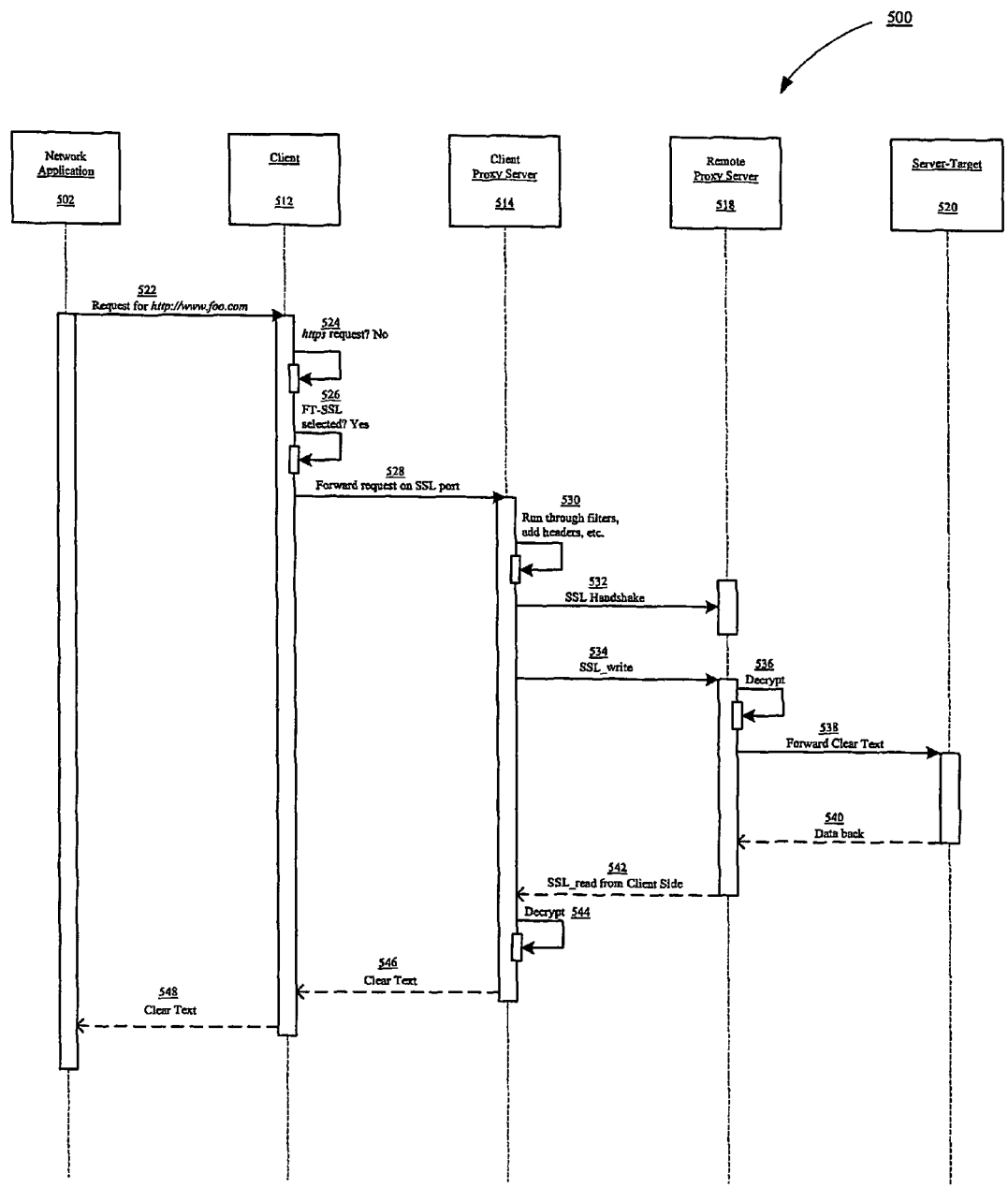
FIG. 5 is a signal flow diagram (which may also be referred to as a "sequence diagram") of an http request with the Full-Time SSL of FIG. 4.
Figure 6:
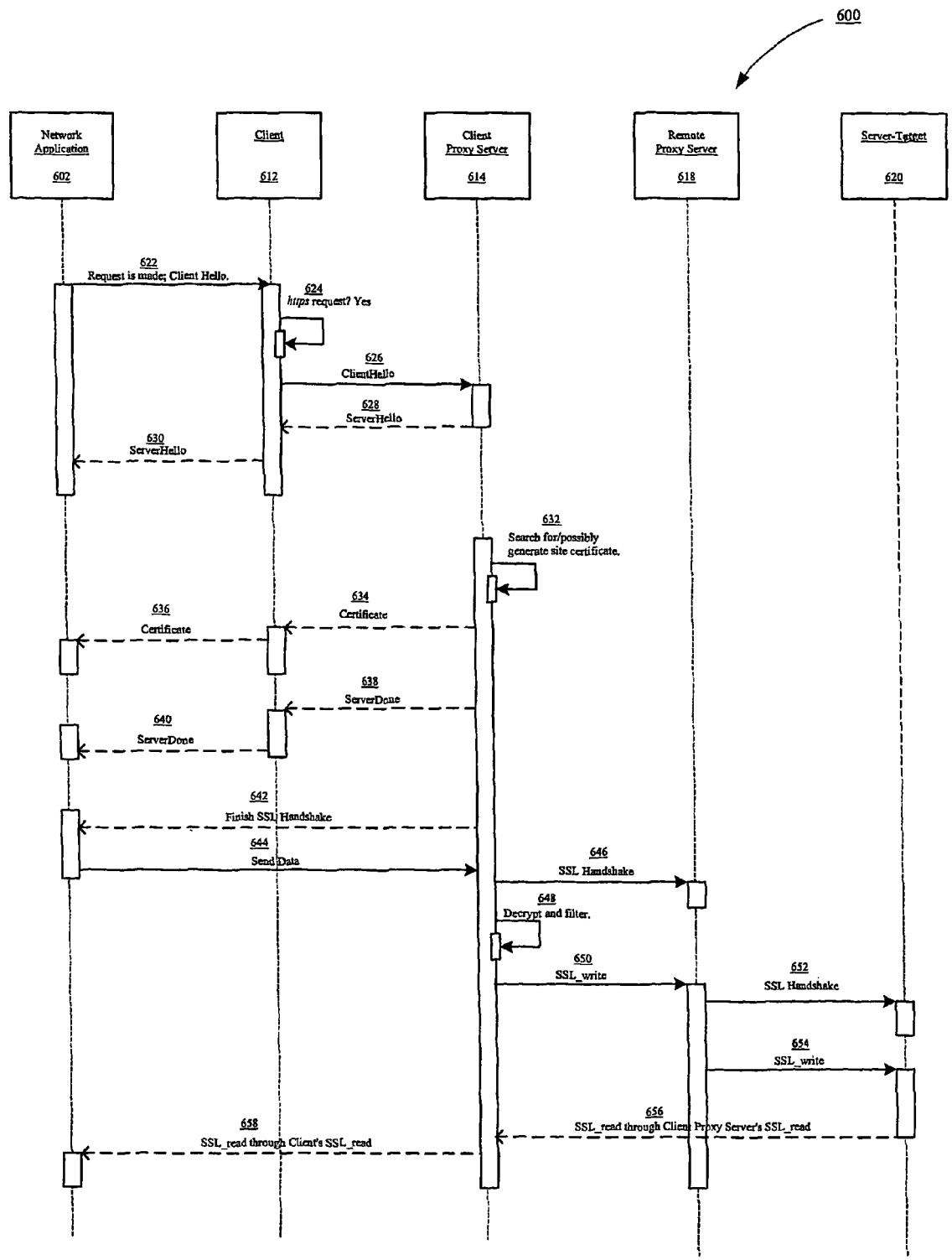
FIG. 6 is a signal flow diagram (which may also be referred to as a "sequence diagram") of an example process for requests made using the Full-Time SSL of FIG. 4.

FIGS. 5 and 6 describe in more detail two (2) approaches of implementing Full-Time SSL. The Client 512, which may be implemented in a Network Application 502 residing on a network device, may provide TCP/IP-level "hooks" to redirect traffic to the Client Proxy Server 514. The SSL module may be accessed by the Client Proxy Server 514 (which may also be implemented by software or hardware residing on the Network Device 102 or some other network device such as a router, gateway, proxy, or other network appliance or device) when it receives a request for an https connection or if "Full-time SSL" has been selected. In FIG. 5, the Network Device 102 makes an http request 522 for connection to an unsecure website, e.g., http://www.foo.com, with Full-Time SSL on. The Client 512 determines that the request is for an unsecure website 524. Next the Client 512 determines that Full-Time SSL is available 526 and begins the process of making a secure connection. The Client 512 then forwards a request 528 on the SSL port of the user's network device to the Client Proxy Server 514.

The Client Proxy Server 514 receives the request 528 and reads and processes the data from the Client 512 by running the data through filters and adding headers 530. For purposes of creating the secure SSL connection, the Client Proxy Server 514 substitutes its own public key or private key for the Client's real keys and commences a SSL session by exchanging a series of messages comprising the SSL handshake sub-protocol 532 with the Remote Proxy Server 518. Once the handshake process is completed and a secure connection is established, the Client Proxy Server 514 will transmit the data to a secure connection by calling the SSL_write 534 function to write data to the Remote Proxy Server 518. The Remote Proxy Server 518 decrypts the data 536 received from the Client Proxy Server 514 and forwards the resulting Clear Text 538 to the desired website Server-Target 520. Server-Target 520 returns Clear Text or data 540 to the Remote Proxy Server

518, which in turn returns encrypted data 542 in a secure connection to the Client Proxy Server 514 via a SSL_read function called from the client side. The Client Proxy Server 514 decrypts the data received 544 and in 546 and 548, respectively, Clear Text is forwarded first to the Client 512 and then to the Network Application 502.

The second way is described by FIG. 6 that is a signal flow diagram (which may also be referred to as a "sequence diagram") of an example process for requests made using SSL. The Network Device 102 makes an https request 622 for connection to a secure website, for example, https://www.foo.com, with a ClientHello. The Client 612 intercepts this outgoing connection and determines that the request is for a secure website 624. The Client 612 sends a ClientHello 626 to the Client Proxy Server 614 to establish a connection. The Client Proxy Server 614 returns a ServerHello 628, thereby pretending to be the end connection. In turn, the Client 612 sends a ServerHello 630 to the Network Application 602. Thus, in effect, the Client 612 has intercepted the request from the Network Application 602 and the Server-Hello 628 from the Client Proxy Server 614 makes it appear to the Network Application 602 that it has a connection with the Server-Target 620.

In 632 the Client Proxy Server 614 checks to see if it has the site cert of the Server-Target 620 stored in its cache (not shown). If the site cert is not found, the Client Proxy Server 614 will generate a site cert for the Server-Target 620 using a new CA or the system's universal site certificate and the user's CA Secret Key. The site cert is sent to the Client 612 and the Network Application 602 in 634 and 636, respectively. This followed by the ServerDone 638 and 640 being sent to the Client 612 and the Network Application 602, respectively. A message is sent finalizing the completion of the SSL handshake process 642 and establishing the connection between the Network Application 602 and the Client Proxy Server 614.

The Network Application 602 sends data 644 to the Client Proxy Server 614, which in turn commences the SSL handshake process 646 with the Remote Proxy Server 618. The Client Proxy Server 614 decodes the SSL record and runs the data through filters 648. The Client Proxy Server 614 calls the SSL_write 650 to the Remote Proxy Server 618. The Remote Proxy Server 618 commences the SSL handshake process 652 with the Server-Target 620. This is followed by the Remote Proxy Server 618 calling the SSL_write 654 to write data to the Server-Target 620. The return data is sent from the Server-Target 620 to the Client Proxy Server 614 via an SSL_read 656 called from the Client Proxy Server 614, and from the Client Proxy Server 614 to the Network Application 602 also via an SSL_read 658 called from the Network Application 602.

In terms of architecture, a TCP Hook module in the Client Proxy Server 614 may be a placeholder for calls and callbacks. In other implementations, the Client Proxy Server 614 may be a fully functional server. This means that the Client Proxy Server 614 may listen on predefined communication ports for incoming secure as well as insecure connections, possibly spawning or starting a new thread to handle each connection. However, if scalability is a consideration, certain of the functions performed by the Client Proxy Server 614 may be performed on the Client 612, thus making for a smaller single point of failure.

When the Client 612 is installed, the Network Device's CA keys may also be generated; also the Public CA key may be installed in the Network Application 602 automatically but if this isn't possible, instructions for manual installation may be provided. A universal site key may be utilized that may be signed by the user's Secret CA key to forge the authentication of the secure site. For security, a background thread may be spawned on startup to generate a new key and swap with the universal site key after it has been generated. The universal site key may be generated and stored in many ways and at many times. For example, it could be changed for every site, or reused for every site.

Figure 7:
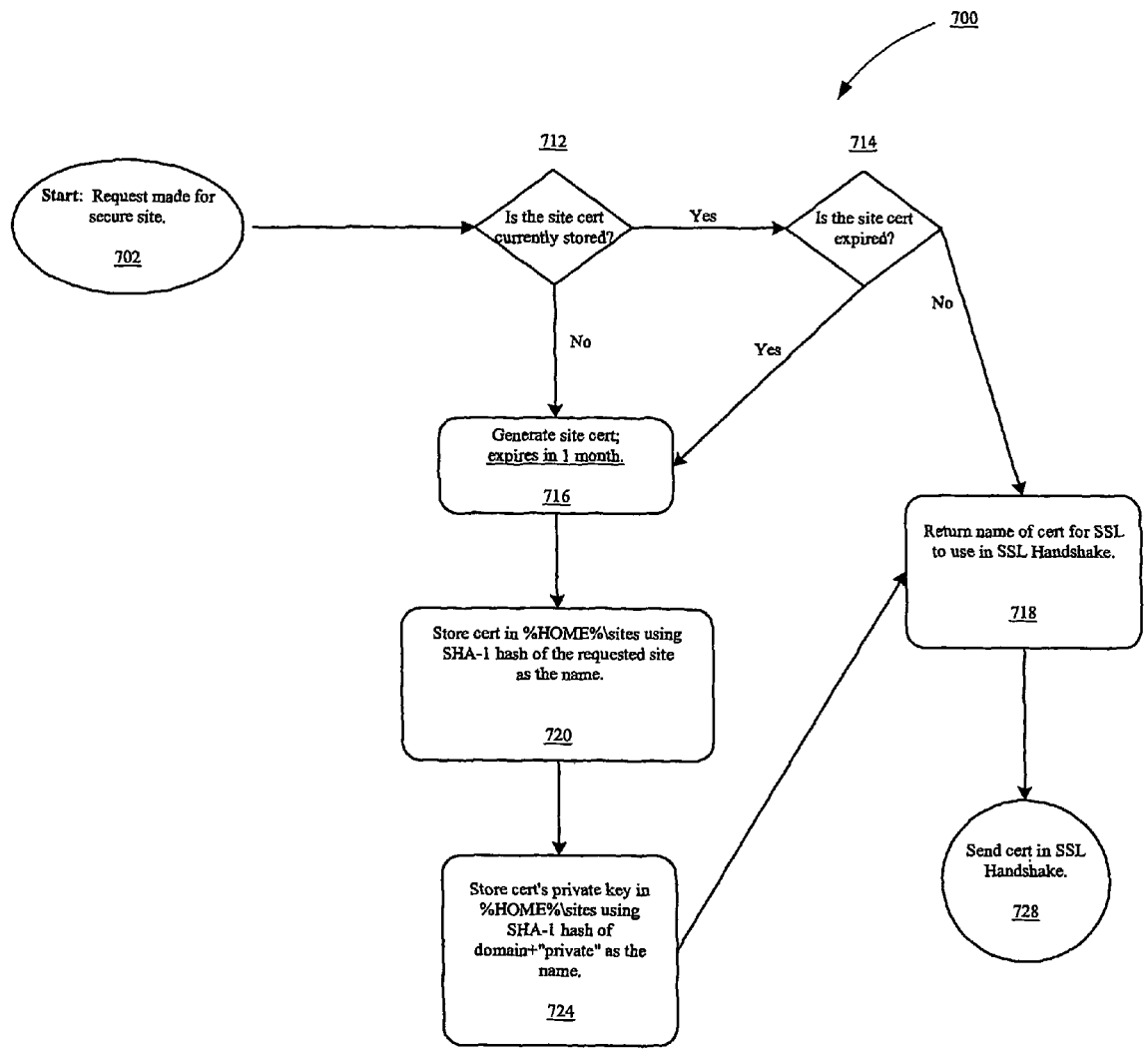
FIG. 7 is a flow chart for the key generation of the Key Module of FIG. 3.

FIG. 7 is a flow chart for an example process performed by the architecture of the implementation, that shows how the identity of the secure server to which the Network Application is attempting to connect is assumed by the Client Proxy Unit. This example process starts in step 702 with a request to connect to a secure site. If a request comes in for a secure site, in step 712 the Client Proxy Server checks if it has the site cert of the Server-Target to return in the SSL handshake stored in the cache (not shown). If the site cert is found, then step 714 checks to see if this site cert has expired. If not, the name of the site cert is returned in step 718 and the site cert is sent with a message initiating the SSL Handshake process with the Client in step 728.

If the site cert is not found in the cache or is found but has expired, then in step 716 the network privacy system generates a site cert for the Server-Target using a new CA or the system's universal site certificate and the Network Device's CA Secret Key. Once generated, this certificate is stored in the cache in steps 720 and 724. This may be done using a SHA-1 (Secure Hash Algorithm) hash function or any other hash function used in authentication routines.

Figure 8:
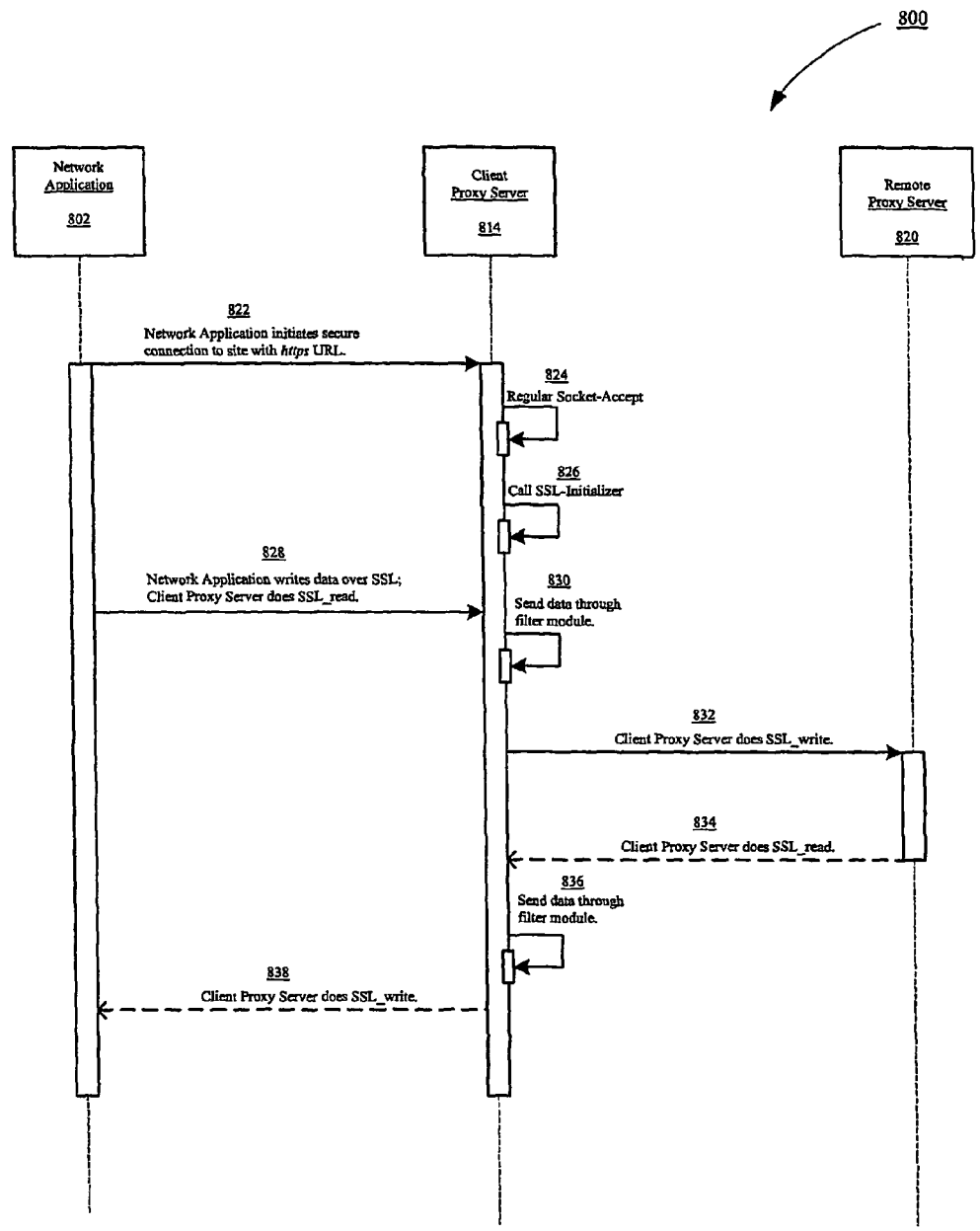
FIG. 8 is a signal flow diagram (which may also be referred to as a "sequence diagram") of an example process for determining the sequence of events on the Client Proxy Server of FIG. 1.

The Client Proxy Server may finish the SSL handshake and begin the consensual man-in-the-middle attack, as shown in FIG. 8. Essentially, what the Client Proxy Server 814 is doing is decoding the SSL records on the Client Proxy Server, redirecting them through the filtering code and then doing an SSL_write to the Remote Proxy Server 820 or directly to the destination web site. A similar flow is used when reading data from the Client Proxy Server 814 where the implementation does an SSL_read giving the system the clear text that was sent. Then the implementation sends it though the filtering code. Finally the implementation may do an SSL_write to the Client Proxy Server 814, which will return it to the Network Application 802.

FIG. 8 is a signal flow diagram (which may also be referred to as a "sequence diagram") of an example process for determining the sequence of events on the Client Proxy Server 814. In FIG. 8, the sequence of events on the Client Proxy Server 814 may be as follows. The TCP Hook module in the Network Application 802 has redirected the Network Application request 822 to the Client Proxy Server 814, and the Client Proxy Server 814 then calls the regular socket-accept function to open a socket 824 and the SSL_initialize function to negotiate the SSL handshake 826. The Network Application 802 writes data over a secure SSL connection, with the Client Proxy Server 814 calling the SSL_read 828. The Client Proxy Server 814 SSL handler may thereafter make calls to the SSL_read/write functions instead of using the standard recv and send calls.

The Client Proxy Server 814 decodes the SSL records and runs the data through filters 830. The Client Proxy Server 814 calls the SSL_write function to write data 832 to the Remote Proxy Server 820 and in turn, calls the SSL_read 834 to receive the Clear Text that was sent to the Remote Proxy Server 820 from the destination website. The Client Proxy Server 814 runs the data through filters 836 and then calls the SSL_write function 838 to write data to the Network Application 802.

It is appreciated that the Client Proxy Server 814 may be reliable so as not to have multiple servers listening on the same port because the implementation should not have more than one on each client. In order to prevent vulnerabilities in the implementation, the server may do some form of client authentication to make sure other applications or even machines are not trying to use the Client Proxy Server 814.

The processes described in FIGS. 1 through 8 may be performed by hardware or software. If the process is performed by software, the software may reside in software memory (not shown) in the controller, memory, or a removable memory medium. The software in memory may include an ordered listing of executable instructions for implementing logical functions (i.e., "logic" that may be implemented either in digital form such as digital circuitry or source code or in analog form such as analog circuitry or an analog source such as an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device, and execute the instructions. In the context of this document, a "computer-readable medium" and/or "signal-bearing medium" is any means that may contain, store, communicate, propagate, or transport the program for use by or in connection with the instruction execution system, apparatus, or device. The computer-readable medium may selectively be, for example but not limited to, an electronic, magnetic, optical, electromagnetic, infrared, or semiconductor system, apparatus, device, or propagation medium. More specific examples, i.e., a non-exhaustive list of the computer-readable media, would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

In general, the embodiments described above provide for consensual Man-in-the Middle attacks being used to rewrite pages, for dynamic creation of site SSL certificates, and generation of CA certs to sign all SSL site certificates. A CA cert may be generated for each user and a CA cert is automatically installed in the browser and SSL page rewriting where the SSL page rewriting includes the client decrypting SSL pages to rewrite before re-encrypting and sending to the proxy or the end website.

Other implementations may also provide for the client to insert information into data streams from browser to network through any kind of header or by inserting cookies. The cookies may include authentication/access rights information and preferences information and utilize XML and encryption.

Other implementations may also provide for a TCP-level Hook for privacy services that includes the TCP-level Hook redirecting traffic to a local proxy on the user's machine, the client proxy redirecting traffic to a remote proxy and the TCP-level Hook allowing IP masking.

Other implementations may also provide for Full-Time SSL without URL prefixing as well as for making cookies session only and/or changing cookie expiration dates.

Other implementations may also provide for gathering and generating Privacy Statistics that include per site privacy statistics, privacy analyzer real-time threat displays, and automated site threat analyses and ratings.

Other implementations may also provide for setting per-site privacy settings that include white lists, black lists, detailed custom settings, "Show details" functionality, recommended site settings lists that include automatically updated and downloaded settings, and lard-coded site settings that cannot be changed by the user or that have preset defaults, and an exception list for selected sites.

Other implementations may also provide for the substitution of personal information related to the user, such as real name, address, phone number, etc., with alternative information for purposes of identity protection, privacy, and tracking prevention. Such implementations may include the automatic substitution of real e-mail addresses, in intercepted communications, with alternative e-mail addresses for purposes of privacy and spam prevention.

Other implementations may also provide for the substitution of alternative or temporary credit card numbers for valid credit card numbers for purposes of enhanced authentication and security, fraud prevention and identity and privacy protection in e-commerce.

Other implementations may also provide for the client to keep a list of alternate access names/IP addresses for accessing servers. The client may try all addresses one after another and/or allow each user to get a different set of access addresses. This would enable the client to access the server even if some intermediary is trying to prevent or block the connection.

Other implementations may also provide for installation on many computers while at the same time detecting and preventing multiple simultaneous users.

Other implementations may also provide for client JavaScript [script] rewriting.

While various embodiments of the application have been described, it will be apparent to those of ordinary skill in the art that many more embodiments and implementations are possible that are within the scope of this invention. Accordingly, the invention is not to be restricted except in light of the attached claims and their equivalents. The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A proxy server in a network, comprising:
an interceptor module configured to intercept a request from a network device to access network data, the request comprising an identifier associated with the network device connected to the network;
the proxy server configured to
send a spoofed certificate to the network device, the spoofed certificate being used to establish a SSL connection between the proxy server and the network device,
open a SSL connection with a source of the network data,
form a message requesting access to the network data, wherein the message has another identifier associated with the proxy server in place of the identifier associated with the network device,
receive a real certificate from the source of the network data,
establish a SSL connection with the source of the network data, and
wherein the proxy server further comprises a parsing module configured to
remove or replace identifying information from packets passing through the proxy server from and/or to the source of the network data,
remove or replace referrer or other identifying headers from the request,
remove or replace cookies from the request or response headers,
remove or replace identifying information from web form submissions, and
remove or replace sensitive information including e-mail addresses or credit card numbers with either false information or alternative information specific to the source of the network data.

2. The proxy server of claim 1, wherein the other identifier associated with the proxy server is a secure identifier.

3. The proxy server of claim 2, wherein the network connection established by the proxy server to the network device is a secure network connection.

4. The proxy server of claim 1, wherein the other identifier associated with the proxy server is an authenticating identifier.

5. The proxy server of claim 4, wherein the network connection established by the proxy server to the network device is an authenticated network connection.

6. The proxy server of claim 1, wherein the message formed by the proxy server requesting access to network data is transmitted in response to a message requesting authentication of the network device.

7. The proxy server of claim 6, wherein the network connection established by the proxy server to the network device is a secure network connection.

8. The proxy server of claim 6, wherein the network connection established by the proxy server to the network device is an authenticated network connection.

9. The proxy server of claim 6, wherein the network connection established by the proxy server to a source of network data is a secure network connection.

10. The proxy server of claim 6, wherein the network connection established by the proxy server to a source of network data is an authenticated network connection.

11. The proxy server of claim 1, further comprising a plurality of modules in signal communication with the proxy server, with at least one of the modules having access to network data.

12. The proxy server of claim 11, wherein the at least one of the plurality of modules is capable of changing network data.

13. The proxy server of claim 12, further comprising a log module in signal communication with the proxy server, capable of monitoring network data.

14. The proxy server of claim 1, further comprising:
a plurality of requests to access network data that contain identifiers associated with a plurality of network devices connected to the network; and
a plurality of messages formed by the proxy server requesting access to network data that have other identifiers associated with the proxy server in place of each of the identifiers associated with each of the network devices.

15. The proxy server of claim 14, further comprising storage configured to store a plurality of other identifiers for association with the proxy server in place of an identifier associated with a Particular network device.

16. The proxy server of claim 1, further comprising:
a key module configured to generate SSL certificates by attempting to retrieve pre-generated SSL certificates from a table stored in cache, and
when an appropriate pre-generated SSL certificate is not found, generating a new SSL certificate dynamically using a universal site certificate and secret key.

17. The proxy server of claim 1, further comprising:
a log module in communication with the parsing module via a communication path, the log module configured to accumulate and store privacy statistics for use in automated site threat analysis and rating, activity logging, performance monitoring, and/or billing.

* * * * *